United States Patent [19]

Hirsch

[11] 4,450,603
[45] May 29, 1984

[54] SAIL LINE STOPPER

[75] Inventor: Jacob Hirsch, Harrison, N.Y.

[73] Assignee: M. David Hirsch, Harrison, N.Y.

[21] Appl. No.: 427,499

[22] Filed: Sep. 29, 1982

[51] Int. Cl.³ .................... F16G 11/00; B65H 17/42
[52] U.S. Cl. .................... 24/132 R; 24/134 R; 24/134 N; 24/115 R; 224/103
[58] Field of Search ......... 24/132 R, 132 AA, 134 R, 24/134 N, 134 KB, 135 N, 115 R; 224/103

[56] References Cited

U.S. PATENT DOCUMENTS

| | | | |
|---|---|---|---|
| 334,878 | 1/1886 | Manners et al. | 24/134 R |
| 1,244,136 | 10/1917 | Segerdahl et al. | 24/134 N |
| 1,496,603 | 6/1924 | Rothenberger | 24/134 R |
| 1,591,344 | 7/1926 | Reeves | 24/134 N |
| 3,540,083 | 11/1970 | O'Connor | 24/132 R |
| 4,071,926 | 2/1978 | Sweet et al. | 24/134 KB |
| 4,308,643 | 1/1982 | Montplaisir | 24/132 R |

*Primary Examiner*—Victor N. Sakran

[57] ABSTRACT

A sail line stopper is provided for controlling the rate of movement of a sailing line prior to or subsequent to the locking of a line in a fixed position. The sail sheet stopper has a base with a channel formed therethrough. A plurality of closely spaced links are mounted for pivotal movement in the base and each of the links has an opening with the line openings forming a channel through which the line to be controlled is positioned. A handle is coupled to the links for controlling the pivotal movement of the links in the base. In a first position the handle aligns the openings allowing the line to move freely through the channel, and in a second position the openings are out of alignment thereby restricting the size of the channel through which the line moves to lock the line in the channel. Intermediate handle positions are provided which control the amount of pivot of the links between the first and second positions to control the size of the channel which permits movement of the line through the channel in accordance with the size of the channel. The channel can be opened regardless of the pressure on the line and the line may be selectively controlled depending on how much the handle is pivoted. In one embodiment the handle contains a pivotal link which may be positioned three ways to allow either of three sizes of line to be accommodated by the sail stopper, and in a second embodiment the handle moves an eccentric cam into a locking position which is retained therein by a spring until released. The sail stopper can be opened no matter what the pressure is on the line and the line can be controlled where it may be eased out slowly and locked in with no slack remaining when the line is locked in place. The sail stopper is used for controlling halyards or sheets in sailboat racing.

7 Claims, 11 Drawing Figures

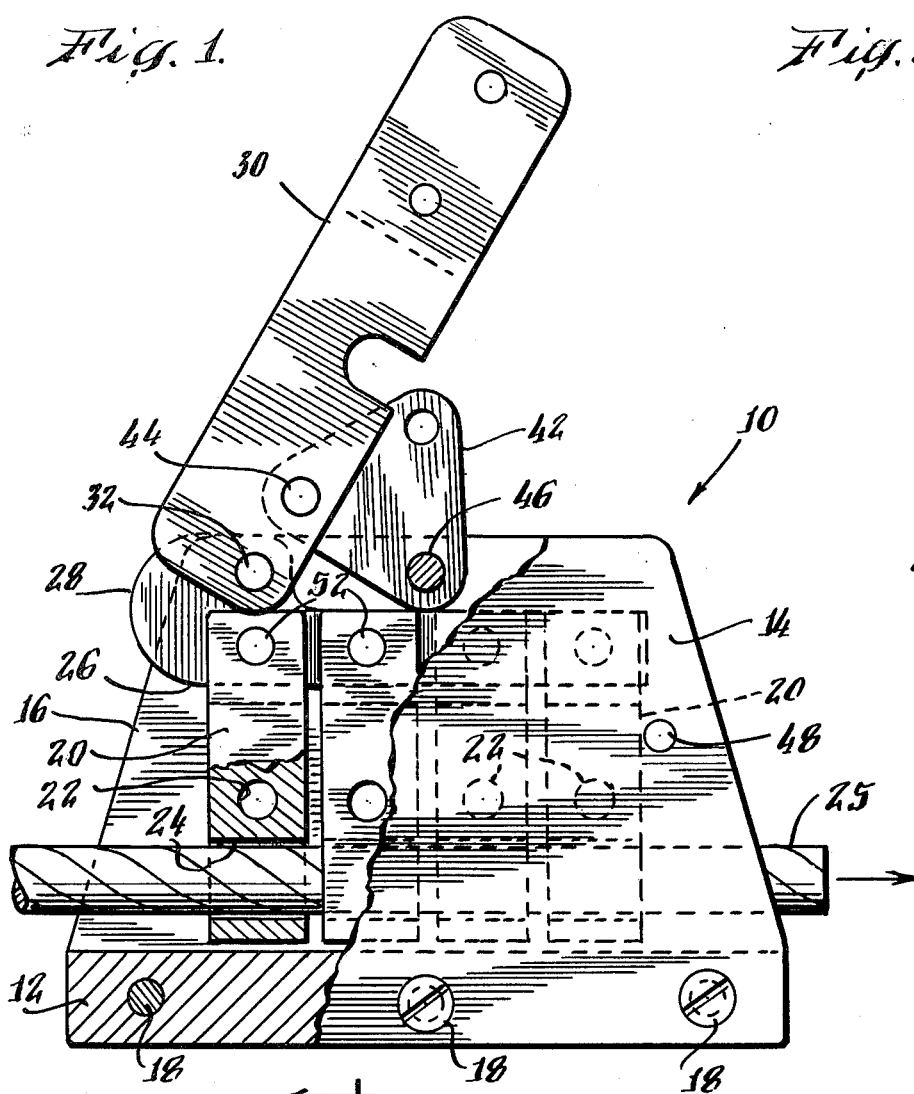
Fig. 1.
Fig. 3.
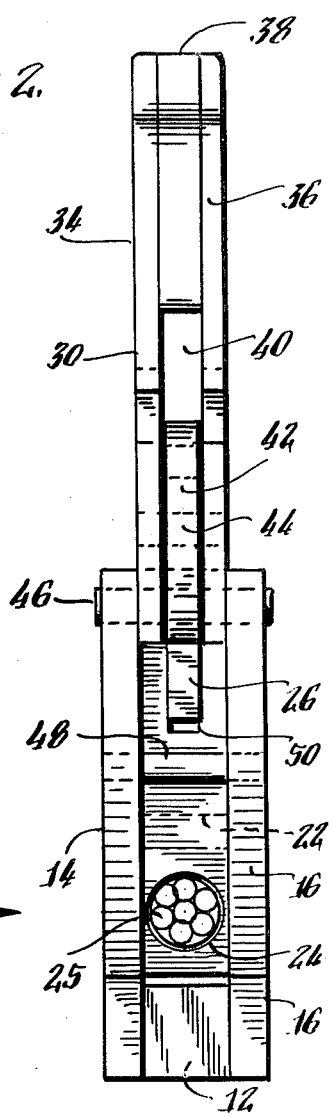
Fig. 2.
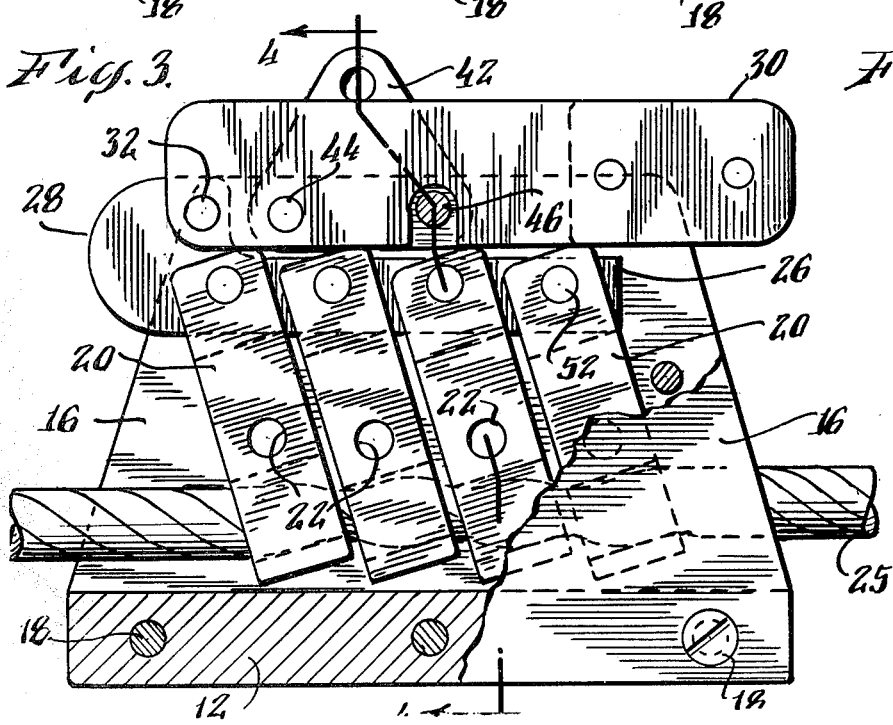
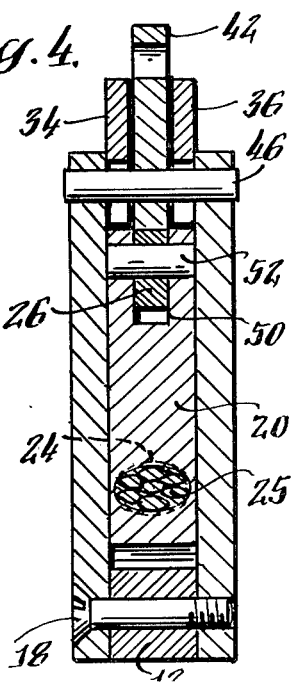
Fig. 4.

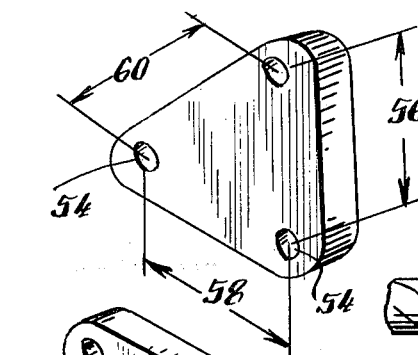
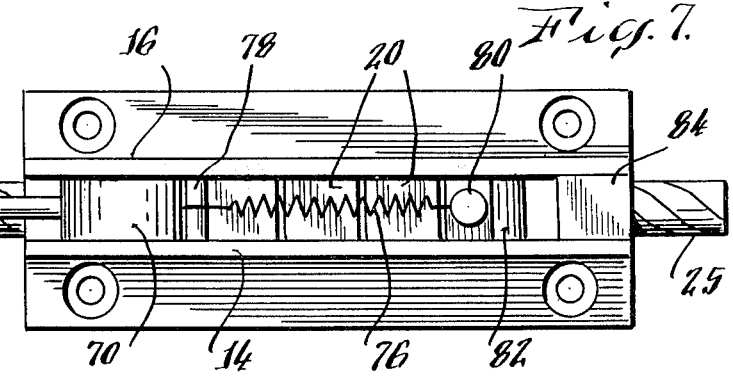
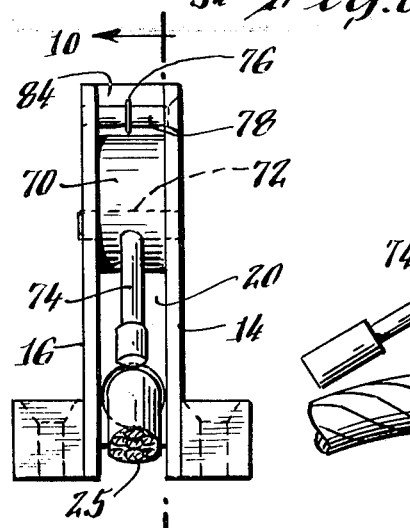
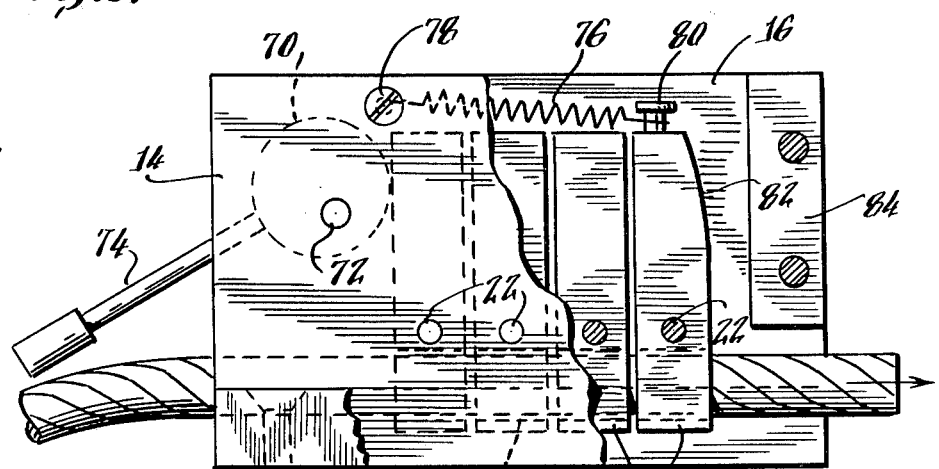
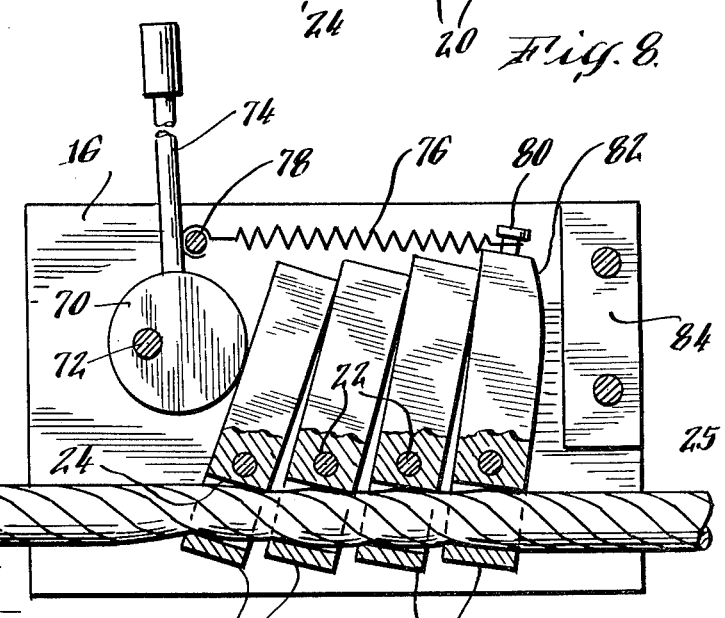
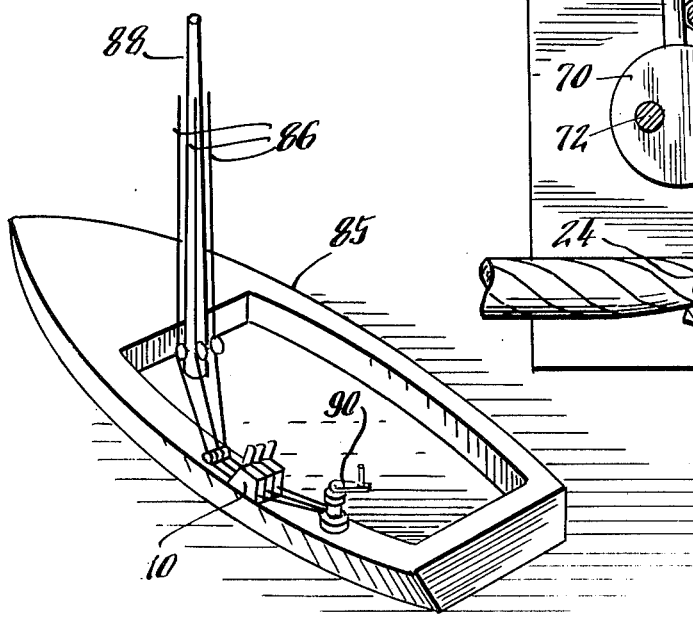

SAIL LINE STOPPER

BACKGROUND OF THE INVENTION

This invention relates to sail line stoppers for controlling sails, and more particularly to such line stoppers in which the line may be eased out slowly no matter what the load on the line is with no slack being placed on the line when it is finally locked in position.

On sailing vessels lines are used to raise and control sails often under heavy load. The load on any given line may vary extensively and when the load increases the use of a winch becomes necessary to set the sail. To allow one winch to be used for several lines, of the same or varying sizes, a sheet or line stopper is provided for each line. When out of engagement the line stopper permits the line to run in both directions while in the engaged position the movement of the line is restricted or completely retarded. As the load increases, a winch is used to set the line in the desired position as control becomes difficult by hand. With presently available line stoppers, while the line may be taken off the winch and still held by the line stopper, it is extremely difficult or impossible to release the line without the use of a winch to hold the load while the line stopper is released. Furthermore, when the line is released by the line stopper and not being held on a winch, if the sail is under a load, the line will be released rapidly and the sail not held in position. In other words, setting the sail by slowly easing the line cannot be done by presently available line stoppers but only by winches. In sailboat racing, putting a line on a winch in order to effect adjustment is time consumming as well as tying up a winch which may be necessary for another control function. Furthermore, if the winch is utilized for setting a sail, individual winches would be required for each sail.

SUMMARY OF THE INVENTION

Accordingly, it is an object of this invention to provide a new and improved sail line stopper which may be utilized in sailboat racing to save time in controlling the operations of sails of the racing boat.

A further object of this invention is to provide a new and improved sail line stopper which eliminates the need of a winch for each line attached to a sail and permits the opening of the line stopper regardless of load.

Still another object of this invention is to supply a new and improved sail line stopper which may be controllably released under high load and does not require a winch to do so and provides such control that no slack exists on the line when the stopper is again locked in position.

Another object of this invention is to provide a new and improved sail line stopper in which the locking mechanism may accommodate a limited range of line sizes.

Still another object of the present invention is to provide a new and improved sheet or halyard stopper for controlling a line on a sailboat which is sturdy, easy to handle and operate, simple in construction, reduces the requirement for winches and saves time in controlling the sails of a racing sailboat.

In carrying out this invention in one illustrative embodiment thereof, a sail line stopper is provided for controlling the rate of movement of a sail line prior to or subsequent to the locking of a line in a fixed position. The sail line stopper has a base with a channel formed therein through which a line to be controlled is positioned. A plurality of closely spaced links are mounted for pivotal movement in the base. Each of the links has an opening therein which form the channel through the base when the openings are aligned to provide an open channel for receiving the line to be controlled thereby. A handle is coupled to the links for controlling the pivoting of the links in the base such that when the handle is in a first position the openings of the links are aligned allowing the line to be moved freely through the channel formed by the openings. When the handle is in a second locking position, the openings are out of alignment restricting the size of the channel through which the line moves to lock the line in the channel. Intermediate handle positions are provided which control the amount of pivot of the links to control the size of the channel permitting of the line to move within the channel in accordance with the size of the channel. Thus, the rate of movement of the line may be controlled by the movement of the handle which pivots the links for controlling the size of the channel through which the line is positioned. In one embodiment, the links are intercoupled and pivoted in unison by an operating element pivoting between the handle and a common interconnecting element. In a second embodiment, an eccentric cam bears on and pivots the free end of the links. A spring is provided that stretches as the links are pivoted and returns them to their aligned position when the handle is released. Advantageously, in both embodiments the size of the channel in the base through which the line to be controlled extends is controlled by the pivotal action of the handle which pivots the links for controlling the size of the channel thereby controlling the permittable movement through the channel by the line. In this arrangement, the line can be eased out slowly without the use of a winch and then can be locked. The line stopper can be opened no matter what the pressure is on the line. Furthermore, no slack will occur in the line, when it is locked in after being eased out, when the line is under almost any kind of pressure. Running the line from the sail through the sail line stopper of this invention permits the trimming or setting of a sail without the use of a winch for that particular operation, freeing the winch for other functions.

BRIEF DESCRIPTION OF THE DRAWINGS

The invention, together with further aspects, features, objects and advantages thereof will be more clearly understood by considering the following description in conjunction with the accompanying drawings in which like elements bear the same reference numerals throughout the several views.

FIG. 1 is a front elevational view, partly broken away, of a sail line stopper in accordance with the present invention showing the handle in a first position in which the line is free to move without obstruction.

FIG. 2 is a side elevational view of FIG. 1.

FIG. 3 a view similar to FIG. 1 showing the handle in a second position with the line being locked in the sail line stopper.

Figure 4 is a cross-sectional view taken along lines 4—4 of FIG. 3.

FIG. 5 is an isometric view of a linkage element which couples the handle of the line stopper to the operating links for controlling the size of the channel through the line stopper.

FIG. 6 is an isometric view of a single link element providing one size of line which may be accommodated by the line stopper of FIG. 1.

FIG. 7 is a top elevational view of another embodiment of a line stopper in accordance with the present invention with the handle operating an eccentric cam illustrated in a first position in which the channel through the line stopper is open.

FIG. 8 is a front elevational view, partly broken away, of the line stopper illustrated in FIG. 7.

FIG. 9 is a side elevational view of the line stopper of FIGS. 7 and 8 from the side viewing the handle.

FIG. 10 is a cross-sectional view taken along line 10—10 of FIG. 9.

FIG. 11 illustrates the sail line stopper of the present invention mounted in a sailboat in which it is adapted to be used.

DESCRIPTION OF THE PREFERRED EMBODIMENTS

Referring now to FIGS. 1 and 2, a sail line stopper, referred to generally with the reference character 10, has a base 12 with upstanding legs 14 and 16 which are mounted on the base 12 by screws 18 thereby forming a U-shaped base. A plurality of links 20 are pivotally mounted on pivot pins 22 in the base between the upstanding legs 14 and 16. The lower end of the links 20 have circular openings 24 therein for accommodating a line 25 which is to be controlled by the line stopper 10. These openings 24 are chamferred in both sides to eliminate sharp edges when in a locked position as will be described so the line will not be abraded. The upper end of the links are interconnected by a coupling link 26 having an enlarged circular head 28 thereon to which a handle 30 is pivotally mounted on a pivot pin 32. The handle 30 as will best be seen in FIG. 2 is formed by two plates 34 and 36 which are separated by spacer 38 on one end thereof being open or hollow at 40 through the other end thereof which opening accommodates a triangular link 42 mounted for pivotal movement in the handle 30 by a pin 44 and mounted for pivotal movement in the base by a pin 46 positioned in the legs 14 and 16 of the base 12. As will best be seen in FIG. 3 a stop post 48 is mounted in the leg 14 of the base 12 for restricting the movement of the links 20 beyond the upright position as shown in FIG. 1.

As will best be seen in FIGS. 3 and 4, the links 20 have downwardly extending slots 50 in the upper ends thereof accommodating the coupling linkage 26. The links 20 are pivotally mounted on the upper end thereof on pins 52 which extend through the slots 50 in the upper end of the links 20.

In operation as will be seen in FIG. 1 with the handle 30 elevated as shown, the openings 24 in the vertically oriented, closely spaced links 20 are aligned with the openings 24 forming a channel through which the line 25 which is desired to be controlled is inserted. Normally the handle is elevated to a position which vertically aligns the links 20 in the base 12 so that the channel formed by the openings 24 is in its fully open position as illustrated in FIG. 1 so that the line 25 may be inserted therethrough. When the handle is moved downward, it is pivoted about pivot 32 and the link 42 pivots about pivots 44 and 46 extending the link 42 up into the hollow 40 of the handle 30. The link 26 is pivoted by handle 30 moves the links 40 in the position shown in FIG. 3 thereby restricting the channel formed by the openings 24 with all of the links pressuring the line which has been inserted therethrough locking the line 25 in the line stopper 20. The handle 30 may be elevated at any intermediate position between those shown in FIGS. 1 and 3 for selectively controlling the size of the channel formed by the openings 22 through the line stopper 10 which allows the line 25 to be selectively loosened depending on the size of the channel. The handle may always be raised fully or selectively regardless of the load that is on the line. Furthermore, once the handle has been raised and then lowered again in the position of FIG. 3, no slack occurs in the line 25 when it is under full or partial load.

As will be seen in FIG. 5, the pivot link 42 has three separated openings 54 which are separated by different distances 56, 58 and 60 with the openings 54 being of the size to accommodate the pivots 44 and 46. The distance between the pivots 44 and 46 determine the size of the line 25 which may be accommodated in the channel formed by the openings 24 of the links 20. The manner the triangular pivot link 46 is positioned between the handle and the legs 14 and 16 will determine the size of the line which may be accommodated in the line stopper 10. Since three different distances 56, 58 and 60 are provided for, three different size lines may be accommodated in the line stopper 10 embodied in FIG. 1 simply by changing the position of the triangular link 42 in the line stopper 10. If only a single size line is desired to be accommodated or used in the stopper 10, a straight smaller link 64 having openings 54 therein to accommodate the pivot pins 44 and 46 separated by a distance 66 will accommodate one size of the line 25 in the line stopper. Accordingly, by changing the linkage, a single or a plurality of line sizes may be accommodated. As an example, typical line sizes might be 5/16, ⅜ and 7/16 in which the channel formed by the openings 24 would be approximately 1/64 of an inch larger than the largest size line to be accommodated. By providing a larger channel, ½, 9/16 and ⅝ inch lines may be accommodated with the triangular linkage 42. Of course, the single link 64 may be used for one size line with the openings 24 being slightly larger than the size of the line which is to be accommodated by the line stopper.

In the embodiment of FIGS. 7 through 10, the pivot actuating mechanism is provided by an eccentric cam formed by a cam 70 which is mounted off-center for pivotal movement about a pivot pin 72 mounted in the legs 14 and 16 of the base of the line stopper. The cam 70 is operated by a solid handle 74. In this embodiment the upper end of the links 20 are not attached or intercoupled. It will be understood however, that a coupling could be used as in FIG. 1. A tension spring 76 is mounted on one end to a pin 78 positioned between the legs 14 and 16 of the base and on the other end to a post 80 mounted on the last link 20 of the group of links with the last link being sloped at 82 to allow it to pivot a given distance before it encounters a stop 84 positioned between the legs of the base of the line stopper 10.

In operation of the embodiment illustrated in FIGS. 7 through 10, when the handle 74 is in the down position as illustrated in FIG. 8, the openings 24 in the links 20 are in alignment with the links 20 being in a closely spaced vertical position in the line stopper 10 forming a channel through which the line 25 which is to be controlled may be inserted. When the handle is raised or elevated as illustrated in FIG. 10, the eccentric cam 70 pivots the first link 20 in the group about its pivot point 22 in the base with the upper end of the first link bearing on the second link in the group and so forth thereby pivoting the entire group of links which restricts the size of the channel formed by the openings 24 thereby locking the line 25 in the line stopper 10. The spring 76 is in full tension holding the handle in its elevated position which in effect is a locking position for the line stopper 10. The spring pin mount 78 also forms a stop for the handle 74 which prevents it from being elevated further than shown in its locking position. The handle may be lowered in numerous intermediate positions between the lowered position shown in FIG. 8 and the elevated position shown in FIG. 9 which vary the size of the channel formed in the line stopper to govern the ease with which the line 25 may be moved in the channel. Accordingly, a controllable release of the line is provided by the line stopper in a fashion similar to FIG. 1.

FIG. 11 illustrates a plurality of line stoppers mounted on a sailboat 85 for controlling a plurality of lines 86 running down a mast 88. It will be understood that other lines from different positions controlling different sails may be used. The free end of the lines 86 may be attached to a winch 90 which may be used to overcome the force of gravity or the wind in raising or setting a sail. When the sail is hoisted or set, the lines 86 may be removed from the winch 90 where such lines will be held in place by the line stopper 10 and free the winch for use on another sheet, line or halyard. In accordance with the present invention by merely operating the handle of the line stopper the lines 86 may be selectively loosened and then locked back in position without the use of a winch to control a heavy load. Furthermore, once the lines are loosened to be let out slightly under load to trim or set a sail, when the line stopper 10 is again locked no slack exists in the line controlled by the line stopper.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A sail line stopper for controlling the rate of movement of a line prior to or subsequent to a locking of the line in a fixed position comprising:
   a base having a channel formed therein through which a line to be controlled is positioned,
   a plurality of closely spaced links mounted for pivotal movement in said base,
   an opening for accommodating a line to be controlled in each of said plurality of links forming said channel through said base,
   a handle coupled to said links for controlling the pivoting of said links in said base, which control the size of said channel through said base,
   said handle in a first position aligning said openings in said links thereby allowing said line to move freely through said channel, said handle in a second position pivoting said links into locking engagement in which said openings are out of alignment thereby restricting the size of the channel through which said line moves to lock said line in said channel, and
   intermediate handle positions between first and second positions which control the amount of pivot of said links to control the size of said channel permitting movement of said line through said channel in accordance of the size of said channel.

2. The sail line stopper set forth in claim 1 in which each of said links is mounted on a pivot pin positioned through said links above said openings.

3. The line stopper set forth in claim 1 having means coupled to said handle for moving said links in unison by the movement of said handle.

4. The sail line stopper set forth in claim 3 in which the upper ends of said links are intercoupled by a coupling plate for moving the upper ends of said links in unison, said coupling link mounted for pivotal movement between said handle and said base, the length of which determines the pivotal throw of said handle for determining within predetermined limits the size of the line which is to be controlled by said line stopper.

5. The said line stopper set forth in claim 4 wherein said coupling link is triangular having different coupling distances along different legs of the triangle for providing a means of changing the line size which will be accommodated by said line stopper.

6. The line stopper set forth in claim 3 having an eccentric cam mounted in said base and having said handle attached thereto for moving said cam thereby, said cam mounted in said base adjacent said links such that on the movement of said handle said cam bears on said links which are thereby pivoted in said base for controlling the size of said channel.

7. The sail line stopper set forth in claim 6 having spring means attached between said links and said base for holding said links in a predetermined locking position.

* * * * *